(12) United States Patent
Cotner et al.

(10) Patent No.: US 8,473,515 B2
(45) Date of Patent: Jun. 25, 2013

(54) MULTI-TENANCY IN DATABASE NAMESPACE

(75) Inventors: Curt L. Cotner, Santa Clara, CA (US); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/777,011

(22) Filed: May 10, 2010

(65) Prior Publication Data

US 2011/0276584 A1 Nov. 10, 2011

(51) Int. Cl.
G06F 7/00 (2006.01)
G06F 17/30 (2006.01)

(52) U.S. Cl.
USPC .......................... 707/782; 707/792; 707/803

(58) Field of Classification Search
USPC .......................................................... 707/782
See application file for complete search history.

(56) References Cited

U.S. PATENT DOCUMENTS

| | | | |
|---|---|---|---|
| 7,340,723 B2 * | 3/2008 | Antonov et al. | 717/116 |
| 7,613,703 B2 * | 11/2009 | Kakivaya et al. | 1/1 |
| 7,634,505 B2 | 12/2009 | Chasman et al. | |
| 2003/0004952 A1 * | 1/2003 | Nixon et al. | 707/10 |
| 2006/0206834 A1 * | 9/2006 | Fisher et al. | 715/777 |
| 2007/0078909 A1 * | 4/2007 | Tamatsu | 707/203 |
| 2007/0143430 A1 * | 6/2007 | Johnson et al. | 709/206 |
| 2008/0005305 A1 | 1/2008 | Hass et al. | |
| 2008/0052673 A1 * | 2/2008 | Hass et al. | 717/120 |
| 2008/0104089 A1 * | 5/2008 | Pragada et al. | 707/100 |
| 2008/0162622 A1 * | 7/2008 | Becker et al. | 709/201 |
| 2008/0162660 A1 | 7/2008 | Becker | |
| 2008/0201701 A1 | 8/2008 | Hofhansl et al. | |
| 2008/0270459 A1 * | 10/2008 | Grewal et al. | 707/103 R |
| 2009/0282045 A1 * | 11/2009 | Hsieh et al. | 707/9 |
| 2009/0288084 A1 * | 11/2009 | Astete et al. | 718/1 |
| 2010/0223467 A1 * | 9/2010 | Dismore et al. | 713/168 |

OTHER PUBLICATIONS

Magoutis, K.; Devarakonda, M.; Joukov, N.; Vogl, N. G.; , "Galapagos: Model-driven discovery of end-to-end application-storage relationships in distributed systems," IBM Journal of Research and Development , vol. 52, No. 4.5, pp. 367-377, Jul. 2008.*
Gao et al., "Part 4: Design Patterns for Sharing Resources in Single Instance Multi-Tenant Applications", IBM Corporation, May 22, 2009.
Grund et al.; "Shared Table Access Pattern Analysis for Multi-Tenant Applications", Germany, IEEE Symposium, Sep. 2008, pp. 1-5.

(Continued)

*Primary Examiner* — Cheryl Lewis
*Assistant Examiner* — Mark E Hershley
(74) *Attorney, Agent, or Firm* — Kali Law Group, PC

(57) ABSTRACT

Database systems are presented including: a database; a database instance of the database, where the database instance includes a set of instance database objects, and where the database instance is accessible by an instance user; and a database tenant associated with the database instance, where the database tenant includes a set of tenant database objects, where the database tenant provides access to the database instance by the tenant user, such that the instance user and the tenant user may independently access the database instance without affecting one another where each of the instance user and the tenant user are configured with independent accessibility. In some embodiments, systems further include: an instance production table associated with the database instance and a tenant production table associated with the database instance.

25 Claims, 6 Drawing Sheets

OTHER PUBLICATIONS

Jegadeesan et al., "A Method to Support Variability of Enterprise Services on The Cloud", IEEE Intl. Con. on Cloud Comp, Sep. 2009, pp. 117-124.

Mietzner et al., "Defining Composite Configurable SaaS Application Packages Using SCA, Variability Descriptiors and Multi-Tenancy Patterns", 3rd Intl. Conf. Int/Web, Jun. 2008.

* cited by examiner

MULTI-TENANCY IN DATABASE NAMESPACE

BACKGROUND

Increasingly, the people cost of managing IT infrastructure has become a dominant cost element in a customer's enterprise IT budget. In the case of database systems, people cost is significantly influenced by the number of database instances the IT organization has to manage. The term, database instance is typically used to describe a complete database environment, including the RDBMS software, table structure, stored procedures and other functionality. The term is most commonly used when administrators describe multiple instances of the same database. In an IT organization, database instances have hardware infrastructure needs (CPU, memory, disk space, etc.) that add additional costs. There may be many scenarios where an IT organization might be able to realize significant savings if the organization was able to run their workload with a greatly reduced number of database instances.

For example, FIG. 1 is an illustrative represent of a prior art database system 100 employing multiple database instances 104 of database 102. As may be appreciated, customers may deploy numerous test and development database instances 104. Often, these systems are shared by multiple developers or testers, and also by multiple independent projects (i.e. user 108). If a given project or projects are going to make disruptive database schema changes to database objects shared across projects, the database administrator (DBA) is forced to create a different database instance for each project in order to prevent the disruptive schema changes from impacting other users of the development or test system thus potentially creating many database instances.

In addition, when customers create shared test systems, they typically do not grant any special administrative privileges to the individual developers on that system, since the developer might misuse those privileges and impact the other developers that run on that same database system. This issue makes it difficult to deploy some of the more advanced application development and tuning solutions—solutions which can help the developer automate many activities such as: creating tables and indexes, tuning SQL queries, testing out database server SQL hints, comparing database access paths from one system to another, etc. However, developers generally can't exploit these solutions because they don't have the required database security privileges on the shared test system.

Furthermore, cloud computing is currently a hot topic. For database systems, the concept behind cloud computing is that a cloud provider can provide database services to applications and end users by deploying virtualized database instances on demand. FIG. 2 is an illustrative representation of a prior art cloud computing system 200 employing multiple database instances 202 of a database cloud 206. With current technology, database cloud computing often requires a unique physical instance 202 for each cloud user group 204 so that the different cloud user groups can be isolated from one another. If a cloud provider has to take this approach, it will be relatively expensive to support large numbers of cloud user groups, since the infrastructure requirements for a full database instance (even when virtualized) are high.

Still further, SAP™ offers an option to consolidate databases for multiple SAP™ components called multiple components-one database (MCOD). MCOD can significantly reduce the number of required database instances resulting in savings across the board. However, many current database management systems (DBMSs) do not generally have appropriate support for MCOD. Namely, once multiple components share the same database they lose ability to be efficiently individually backed-up, recovered, cloned, etc. This is a major obstacle for wider use of MCOD. As such, the actual exploitation of this useful option remains limited.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Database systems are presented including: a database; a database instance of the database, where the database instance includes a set of instance database objects, and where the database instance is accessible by an instance user; and a database tenant associated with the database instance, where the database tenant includes a set of tenant database objects, where the database tenant provides access to the database instance by the tenant user, such that the instance user and the tenant user may independently access the database instance without affecting one another where each of the instance user and the tenant user are configured with independent accessibility. In some embodiments, systems further include: an instance production table associated with the database instance for storing a portion of the set of instance database objects, the instance production table accessible by the instance user and the tenant user; and a tenant production table associated with the database instance for storing the set of tenant database objects, the tenant production table accessible by the tenant user, where the set of tenant database objects correspond with a portion of the set of instance database objects. In some embodiments, operations performed utilizing the database tenants are configured for accessing the database instance without changing the database instance. In some embodiments, the set of instance database objects is accessible by the tenant user.

In other embodiments, methods for providing multi-tenancy in a database system for users associated with a database instance of a database utilizing an electronic computing device are presented including: causing the electronic computing device to create the database instance, the database instance configured for providing a set of instance database objects, and where the database instance is accessible by an instance user; and a database tenant associated with the database instance, where the database tenant includes a set of tenant database objects, where the database tenant provides access to the database instance by the tenant user, such that the instance user and the tenant user may independently access the database instance without affecting one another where each of the instance user and the tenant user are configured with independent accessibility.

In other embodiments, computing device program products for providing multiply privileged access with a database for a number of users utilizing a database instance of the database utilizing an electronic computing device are presented including: a computer readable medium; first programmatic instructions for creating the database instance, the database instance configured for providing a set of instance database objects, where the database instance is accessible by an instance user; second programmatic instructions for creating a database tenant associated with the database instance, where the database tenant includes a set of tenant database objects, where the database tenant provides access to the database instance by the tenant user, such that the instance user and the tenant user may independently access the database instance without affecting one another where each of the instance user and the tenant user are configured with independent accessibility.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
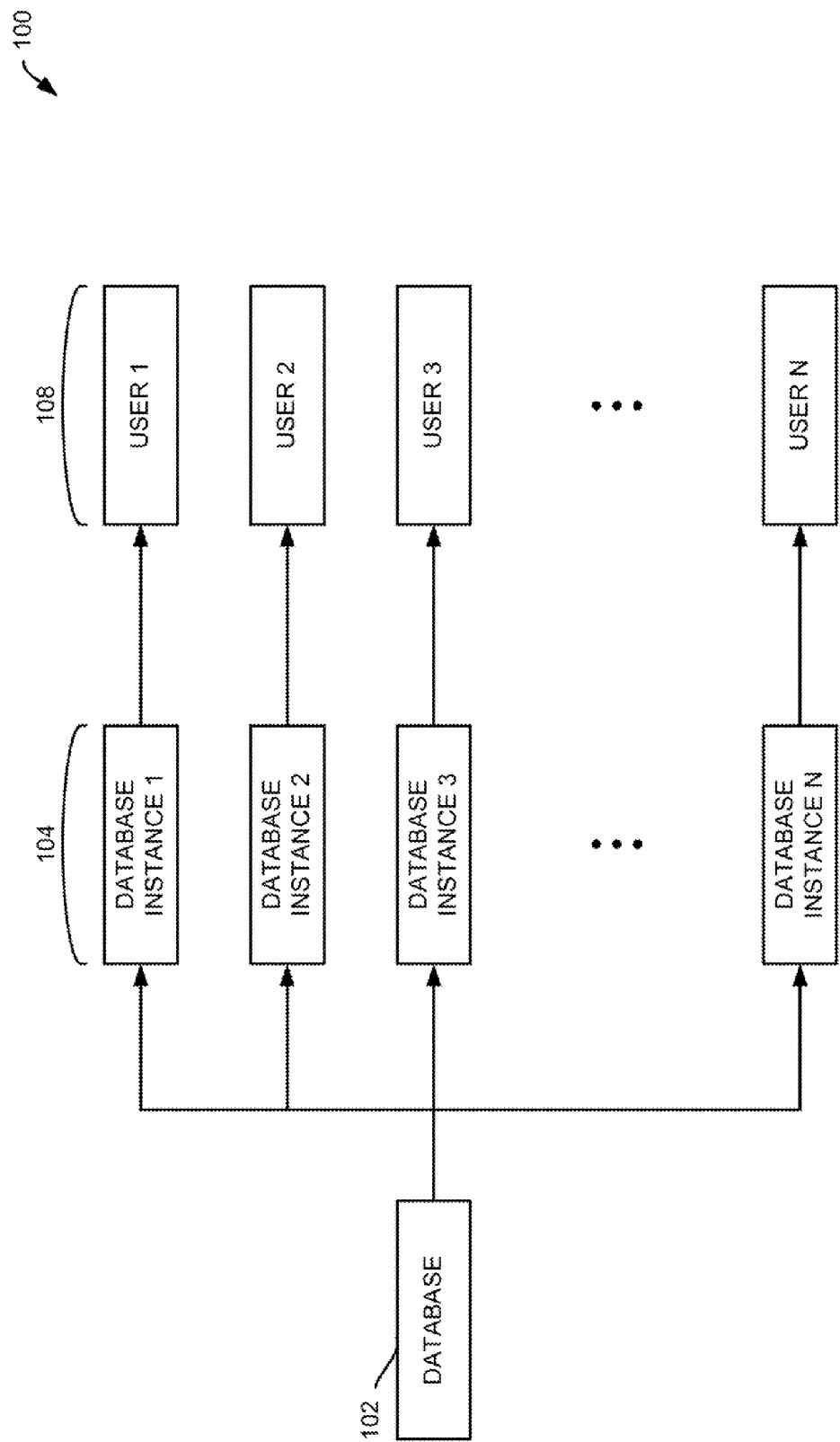
FIG. 1 is an illustrative representation of a prior art database system employing multiple database instances of a database.
Figure 2:
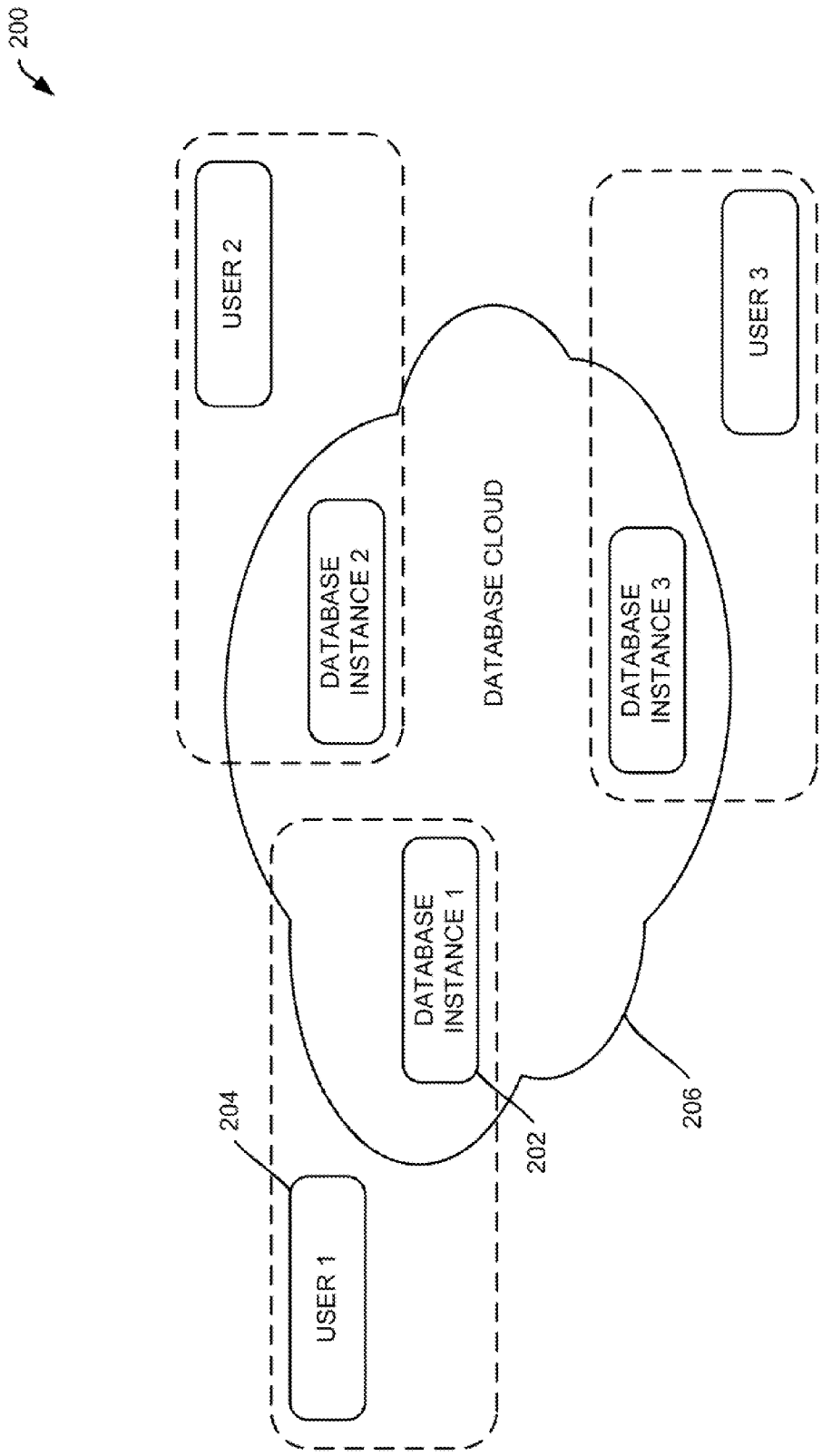
FIG. 2 is an illustrative representation of a prior art cloud computing system employing multiple database instances of a database.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments disclosed herein introduce the concept of one or more tenants (i.e. multi-tenancy) in a database object namespace. Tenancy may be utilized to implicitly identify which set of database objects are to be used for a given segment of the database user population. As an example, a database table may be uniquely identified with three tokens namely:

DATABASE.SCHEMA.TABLENAME

In this example, DATABASE identifies the database system instance; SCHEMA identifies the table owner; and TABLENAME identifies the table within that schema. With tenancy, a namespace embodiment may be expanded to:

DATABASE.TENANT.SCHEMA.TABLENAME

In this embodiment, DATABASE identifies the database system instance; TENANT identifies a database tenant within the database system instance; SCHEMA identifies the table owner; and TABLENAME identifies the table within that schema. However, it should be noted that any order of the namespace may be utilized without departing from the present invention. For example, in one embodiment, the name space may be:

DATABASE.TABLENAME.SCHEMA.TENANT.

Thus, the namespace embodiment provides addressability for the database tenant. Furthermore, this namespace embodiment allows a database to store multiple production tables in the same database instance, while still keeping the table contents (i.e. the rows), the table layout (i.e. the table schema definition), and the table access control rules (i.e. grants, constraints, triggers, etc.) completely independent for these multiple tables that bear the same name. In embodiments, this namespace virtualization will be largely transparent to the end users, applications, and application developers, but will provide a DBA the means to introduce isolation between user segments when their needs are incompatible with using a shared database object.

Figure 3:
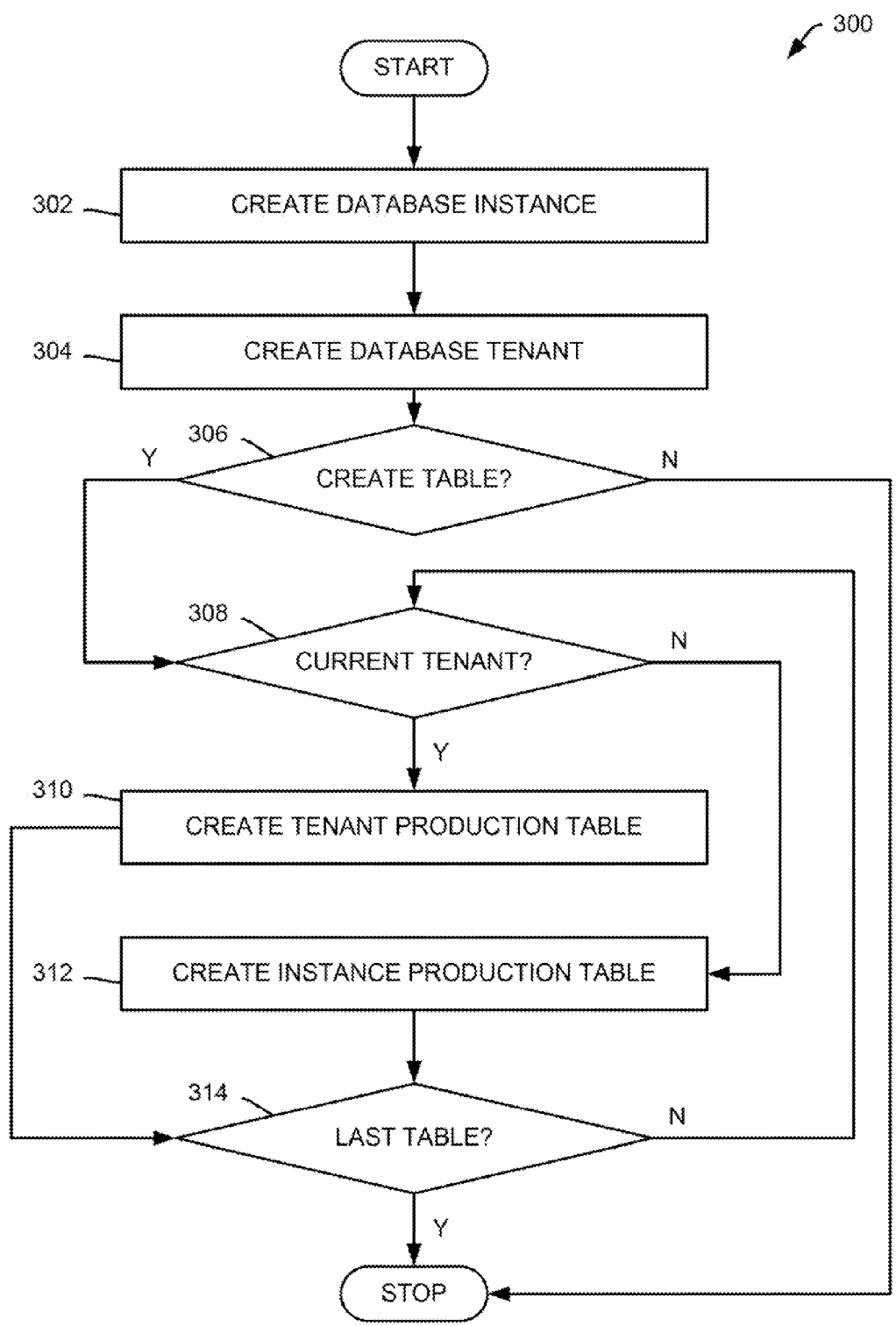
FIG. 3 is an illustrative flowchart of a method for providing multi-tenancy in a database system in accordance with embodiments of the present invention.

FIG. 3 is an illustrative flowchart 300 of a method for providing multi-tenancy in a database system in accordance with embodiments of the present invention. At a first step 302, the method creates a database instance of a database. In creating a database instance, access may be given to one or more instance users or to one or more tenant users. In addition, a public database may include a set of instance database objects which the instance users may access. In some embodiments, a database instance may all ready be present in which case a step 302 is optional. At a next step 304, a database tenant is created. In creating a database tenant, access may be given to one or more tenant users. In embodiments, a database tenant may include a set of tenant database objects. In other embodiments, a database tenant may include a set of tenant database objects corresponding with a portion of the set of instance database objects. Thus a private database object may or may not be a modified public database object in embodiments. As configured, operations performed utilizing a database tenant in embodiments, are configured for accessing the database instance without changing the database instance. In embodiments, a database tenant may be defined utilizing data definition language (DDL). In embodiments, DDL statements may include: a create tenant DDL for creating the database tenant, a drop tenant DDL for dropping the database tenant, a grant tenant DDL for granting access to the database tenant, and a revoke DDL for revoking access to the database tenant. In some embodiments, a structured query language (SQL) register and bind option for providing access to the database tenant for tenant users.

At a next step 306, the method determines whether to create a production table. If the method determines at a step 306 not to create a production table, the method ends. If the method determines at a step 306 to create a production table, the method continues to a step 308 to determine whether a current tenant is available. If the method determines at a step 308 that a current tenant is available, the method continues to a step 310 to create a tenant production table. In embodiments, a tenant production table may be configured for storing a set of tenant database objects and for accessing by tenant users. Further, in embodiments, tenant production tables may include: table contents, table layouts, and table access control rules. The method continues to a step 314 to determine whether additional tables are required. Returning to a step 308, if the method determines at a step 308 that a current tenant is not available, the method continues to a step 312 to create an instance production table. In embodiments, an instance production table may be configured for storing a set of instance database objects and for accessing by instance users and by tenant users. Further, in embodiments, instance production tables may include: table contents, table layouts, and table access control rules. The method continues to a step 314 to determine whether additional tables are required. If the method determines at a step 314 that additional tables are required, the method returns to a step 308. If the method determines at a step 314 that no additional tables are required, the method ends.

Figure 4:
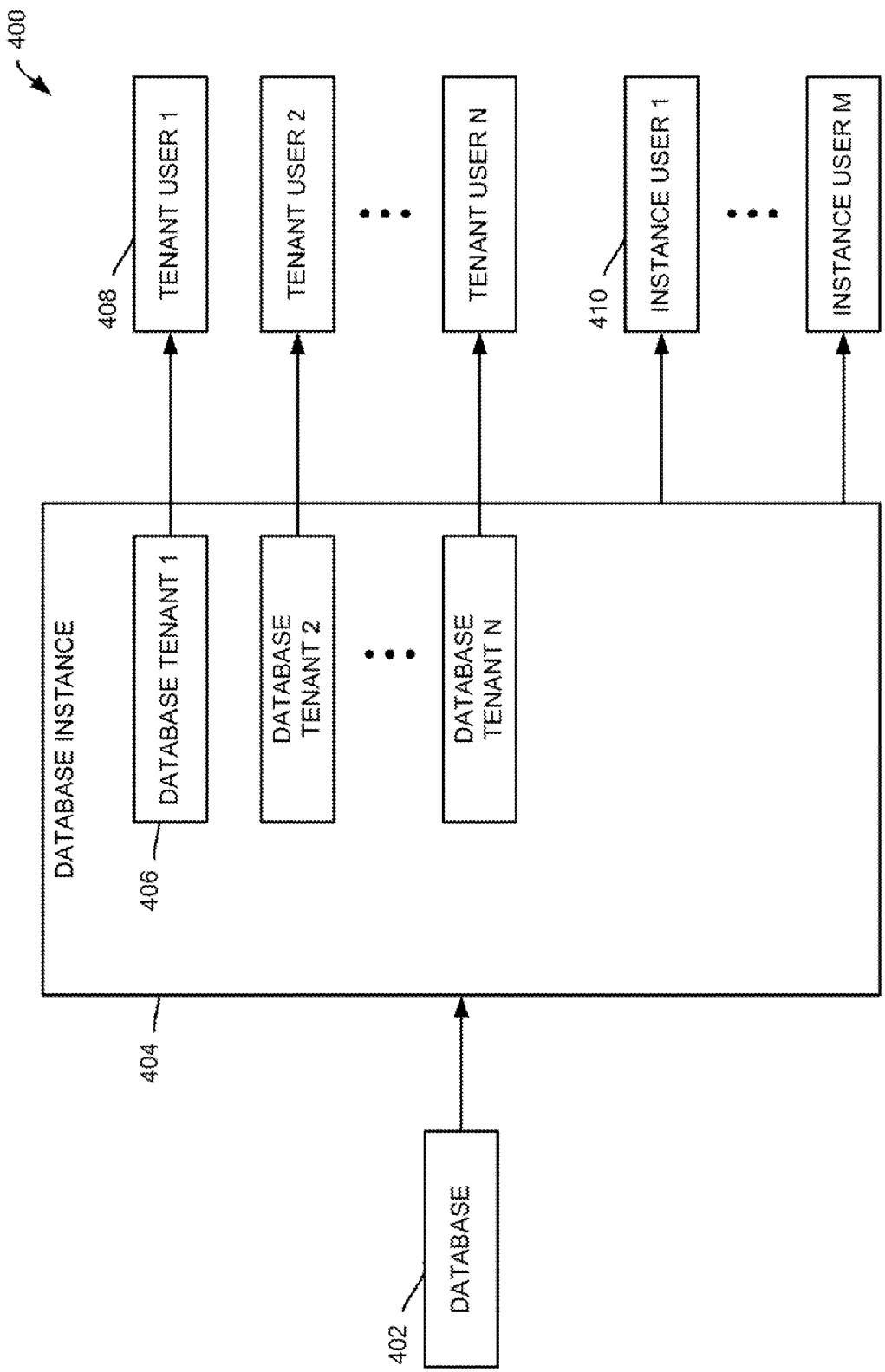
FIG. 4 is an illustrative representation of a database system utilizing multi-tenancy in accordance with embodiments of the present invention.

FIG. 4 is an illustrative representation of a database system 400 utilizing multi-tenancy in accordance with embodiments of the present invention. As illustrated, utilizing methods described above, database system 400 may include database 402 from which database instance 404 may be created. Instance users 410 may access database instance 404. In addition, tenant users 408 may access database instance 404 via database tenant 406. In embodiments, database tenants may introduce isolation between user segments when their needs are incompatible with using a shared database object. For example, assume there are five different teams working on a shared development/test database system, but one teams needs to make disruptive schema changes to database objects that are used by the other four teams. Instead of creating a new database instance for the disruptive work, a DBA can create a database tenant for disruptive work called DISRUPTIVE_WORK tenant. The DISRUPTIVE_WORK tenant objects (i.e. set of tenant database objects) may be visible to anyone that connecting with the DISRUPTIVE_WORK tenant, but all other users of the development/test database system will not see or be influenced by those objects. Thus, users accessing the DISRUPTIVE_WORK tenant could: modify the apps, change how the table's triggers work, add new table check constraints, etc. which work would have no impact on the rest of the users on the development/test database system. In embodiments, for set of instance database objects that won't be changed, those objects will continue to be visible and usable to all members of development/test database system. In this manner, instance users and tenant users may each work independently on the same database instance without affecting one another. Furthermore, in embodiments, public and tenant users may have independent (i.e. different or the same) accessibility without limitation.

Figure 5:
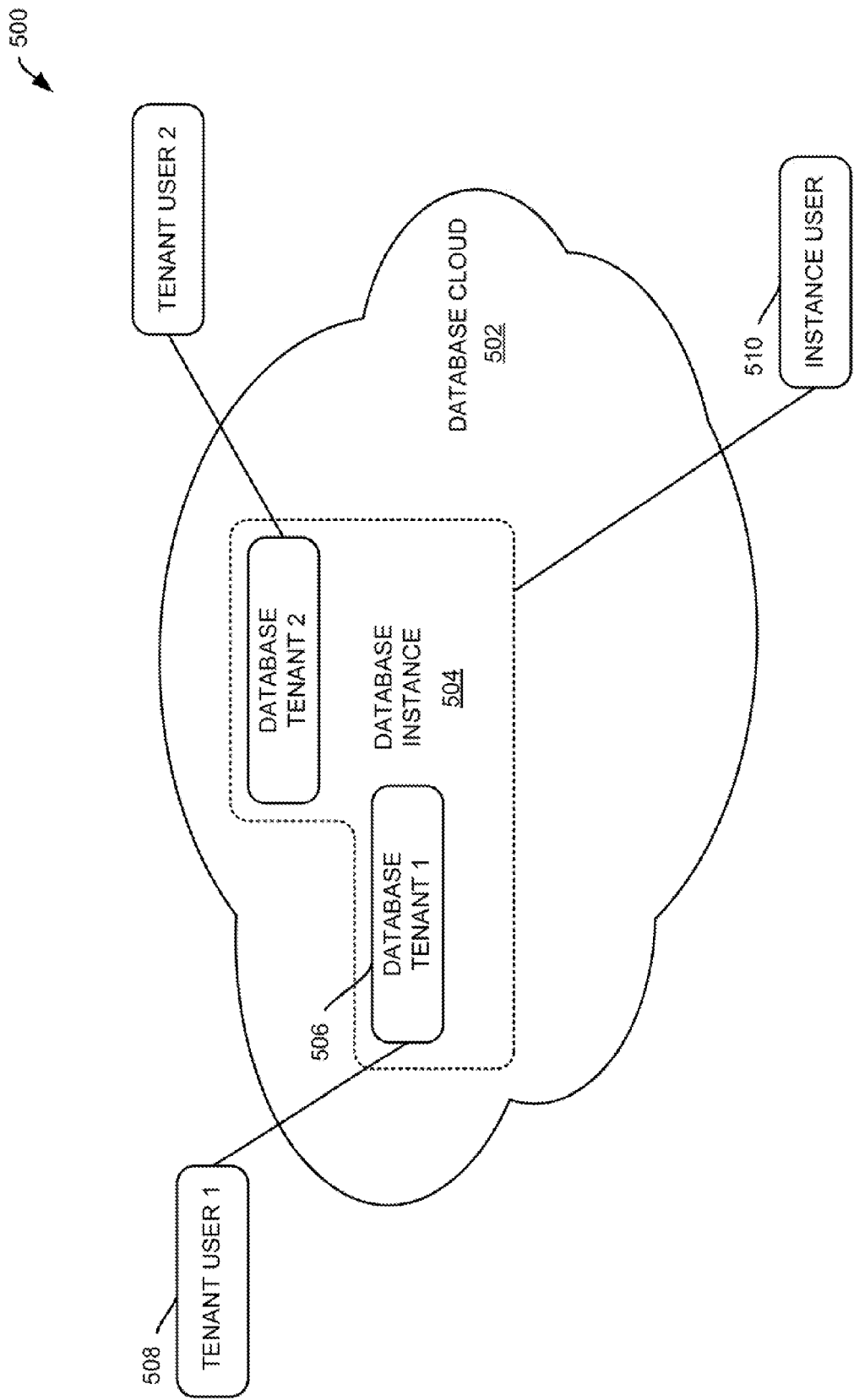
FIG. 5 is an illustrative representation of a database cloud system utilizing multi-tenancy in accordance with embodiments of the present invention.

FIG. 5 is an illustrative representation of a database cloud system 500 utilizing multi-tenancy in accordance with embodiments of the present invention. As illustrated, utilizing methods described above, database system 500 may include database cloud 502 from which database instance 504 may be created. Instance user 510 may access database instance 504. In addition, tenant users 508 may access database instance 504 via database tenant 506. As illustrated, each tenant user or user group that connects to with database cloud 502 can be given their own unique TENANT name. This will allow a DBA to host multiple groups on the same database instance. Each database tenant may be configured with full schema isolation, so that each database tenant can have their own unique table schema definitions. For example, two groups can have a table named FOO.TABLE, and the schema for those two groups can be exactly the same or entirely different. If a cloud provider is hosting a database application across multiple tenants, this means that the tenants can evolve their database schemas independently. Thus, for example, tenant ABC could upgrade to a new release of a hosted database application with whatever schema changes that are involved in that upgrade while not disrupting the other tenants that run the prior version of that same application. In conventional systems, a cloud provider would have had to move an upgrading tenant to a different database instance to perform this kind of upgrade. In some embodiments, a database cloud system infrastructure (e.g. log space, buffer pool memory, database product code binaries, etc.) may be shared, so the cloud provider's costs per tenant may, in turn, be significantly reduced.

As noted above, many current database management systems (DBMSs) do not generally have appropriate support for SAP™ multiple component-one database (MCOD). Namely, once multiple components share the same database they lose ability to be efficiently individually backed-up, recovered, cloned, etc. Therefore, in embodiments, database systems disclosed herein may be configured to operate over an SAP™ MCOD system. In those embodiments, each of the MCOD user groups may be assigned their own unique TENANT name. SAP™ systems may be configured with thousands of tables. Many of these tables contain rows that are exactly the same from one user group to the next (e.g. city zip code lookup tables, state sales tax rate tables, etc.). Tables that are exactly the same for all user groups may be created in the PUBLIC tenant, so that a single physical copy may be shared by multiple tenants. Tables that contain tenant-specific data can be created uniquely within a given tenant namespace, so that the table definition and the content of that table is private to that particular tenant group. This configuration allows multiple MCOD groups to run in a single database instance creating unique tables only when absolutely necessary. When a SAP™ database catalog is partitioned by TENANT, it is a simple matter for SAP™ to restore the database catalog for a given tenant to a particular point in time, so that the tenant's schema was restored to a prior point of consistency without forcing other tenants to make the same change. This would give SAP™ a much higher degree of independence across the various MCOD groups that happen to be running on the same instance.

Further as noted above, when customers create shared test systems, they typically do not grant any special administrative privileges to the individual developers on that system, since the developer might misuse those privileges and impact the other developers that run on that same database system. Therefore, in embodiments, database systems disclosed herein may be configured for shared test systems. In embodiments, objects may be created uniquely within a given TENANT namespace. The same may be applied to database privileges. For example, a developer with database administration authority (DBADM) privileges on a JOE_SMITH tenant would be able to:

bind a package containing all the SQL statements he want's to study;

issue EXPLAIN on these statements to look at access path (with the help of the automated development tools he's using);

have those tools automatically issue SQL access path hints to see if those hints improve performance of the statements; and have the tools create additional tables and indexes to see if modified schema changes improve performance—All without affecting the database instance.

Thus, embodiments disclosed herein would allow a DBA to create a privileged "sandbox" for a developer, allowing the developer's sophisticated toolset to experiment with various database features and functions that would ordinarily require a great deal of the DBA's time.

Figure 6:
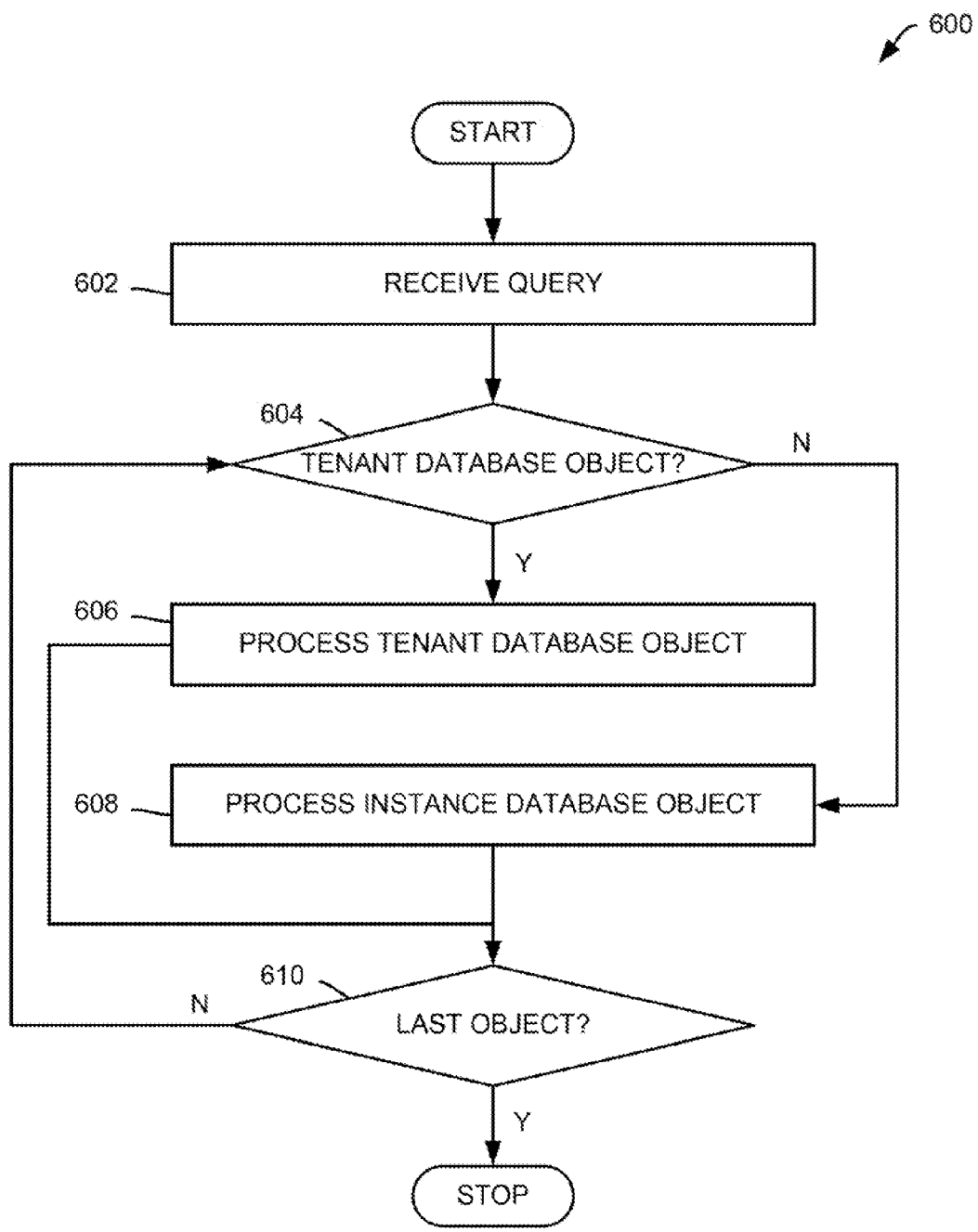
FIG. 6 is an illustrative flowchart of a method for processing a query in a multi-tenancy environment in accordance with embodiments of the present invention.

FIG. 6 is an illustrative flowchart 600 of a method for processing a query in a multi-tenancy environment in accordance with embodiments of the present invention. At a first step 602, the method receives a query. Queries may be received in any manner known in the art without departing from embodiments disclosed herein. At a next step 604, the method determines whether a query includes objects corresponding with a set of tenant database objects in a database tenant. If the method determines at a step 604 that the query includes objects corresponding with a set of tenant database objects in a database tenant, the method proceeds to a step 606 to process the tenant database object in a tenant production table, whereupon the method continues to a step 610. If the method determines at a step 604 that the query does not include objects corresponding with a set of tenant database objects in a database tenant, the method proceeds to a step 608 to process objects corresponding with a set of instance database objects in an instance production table, whereupon the method continues to a step 610. At a step 610, the method determines whether the processed object is the last object. If the method determines at a step 610 that the processed object is not the last object, the method continues to a step 604. If the method determines at a step 610 that the processed object is the last object, the method ends.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A database system comprising:
   a database;
   a database instance of the database, wherein the database instance includes a set of instance database objects, and wherein the database instance is accessible by at least an instance user; and
   at least one database tenant associated with the database instance, wherein the at least one database tenant includes a set of tenant database objects, wherein the at least one database tenant provides access to the database instance by the at least one tenant user, such that the at least one instance user and the at least one tenant user may independently access the database instance without affecting one another, wherein each of the at least one instance user and the at least one tenant user are configured with independent accessibility, wherein the at least one database tenant is addressable by a namespace of the form, DATABASE.TENANT.SCHEMA.TABLE-NAME, wherein DATABASE identifies a database system instance, wherein TENANT identifies a database tenant, wherein SCHEMA identifies a table owner, and wherein TABLEAME identifies a table within the SCHEMA, and wherein the namespace is configured to allow the database to store multiple production tables in the same database instance while keeping the multiple production tables having a same name completely independent from one another.

2. The database system of claim 1 further comprising:
   an instance production table associated with the database instance for storing a portion of the set of instance database objects, the instance production table accessible by the instance user and the at least one tenant user wherein at least some of the set of tenant database objects correspond with a portion of the set of instance database objects; and
   a tenant production table associated with the database instance for storing the set of tenant database objects, the tenant production table accessible by the at least one tenant user.

3. The database system of claim 2, wherein the instance production table and the tenant production table include at least: table contents, table layouts, and table access control rules.

4. The database system of claim 1, wherein operations performed utilizing the at least one database tenant are configured for accessing the database instance without changing the database instance.

5. The database system of claim 1, wherein the set of instance database objects are accessible by the at least one tenant user.

6. The database system of claim 1 further comprising a structured query language (SQL) register and bind option for providing, access to the database tenant for the at least one tenant user.

7. The database system of claim 1 further comprising a data definition language (DDL) statement selected from the group consisting of: a create tenant DDL for creating the database tenant, a drop tenant DDL for dropping the database tenant, a grant tenant DDL for granting access to the database tenant, and a revoke DDL for revoking, access to the database tenant.

8. The database system of claim 1, wherein the database system is configured to operate over a cloud computing system.

9. The database system of claim 1, wherein the database system is configured to operate over an SAP™ multiple component-one database system.

10. The database system of claim 1, farther comprising:
    at least one public tenant configured for sharing a table by any of the at least one tenant users.

11. A method for providing multi-tenancy in a database system for a plurality of users associated with a database instance of a database utilizing an electronic computing device, the method comprising:
    causing the electronic computing device to create the database instance, the database instance configured for providing a set of instance database objects, wherein the database instance is accessible by at least an instance user;
    creating at least one database tenant associated with the database instance, wherein the at least one database tenant includes a set of tenant database objects, wherein the at least one database tenant provides access to the database instance by the at least one tenant user, such that the at least one instance user and the at least one tenant user may independently access the database instance without affecting one another, wherein each of the at least one instance user and the at least one tenant user are configured with independent accessibility, wherein the at least one database tenant is addressable by a namespace of the form, DATABASE.TENANT.SCHEMA.TABLE-NAME, wherein DATABASE identifies a database system instance, wherein TENANT identifies a database tenant, wherein SCHEMA identifies a table owner, and wherein TABLENAME identifies a table within the SCHEMA, and wherein the namespace is configured to allow the database to store multiple production tables in the same database instance while keeping the multiple production tables having a same name completely independent from one another.

12. The method of claim 11 further comprising:
    generating an instance production table associated with the database instance for storing a portion of the set of instance database objects, the instance production table accessible by the instance user and the at least one tenant user, wherein at least some of the set of tenant database objects correspond with a portion of the set of instance database objects; and
    generating a tenant production table associated with the database instance for storing the set of tenant database objects, the tenant production table accessible by the at least one tenant user.

13. The method of claim 12, wherein the instance production table and the tenant production table include at least: table contents, table layouts, and table access control rules.

14. The method of claim 12 further comprising;
    receiving a query to the database;
    determining whether the query includes a first object corresponding with the set of tenant database objects;
    if the first object corresponds with the set of tenant database objects, processing the first object from the tenant production table; else
    processing the first object from the instance production table.

15. The method of claim 11, wherein operations performed utilizing the at least one database tenant are configured for accessing the database instance without changing the database instance.

16. The method of claim 11, wherein the set of instance database objects are accessible by the at least one tenant user.

17. The method of claim 11 further comprising providing a structured query language (SQL) register and bind option for providing access to the database tenant for the at least one tenant user.

18. The method of claim 11 further comprising providing, a data definition language (DDL) statement selected from the group consisting of: a create tenant DDL for creating the database tenant, a drop tenant DDL for dropping the database tenant, a grant tenant DDL for granting access to the database tenant, and a revoke DDL for revoking access to the database tenant.

19. The method of claim 11, wherein the database is configured to operate over a cloud computing system.

20. The method of claim 11, wherein the database is configured to operate over an SAP™ multiple component-one database system.

21. The method of claim 11, further comprising:
creating at least one public tenant configured for sharing as table by any of the at least one tenant users.

22. A computing device program product for providing multiply privilege access with a database for a plurality of users utilizing a database instance of the database utilizing an electronic computing device, the computing device program product comprising:
a non-transitory computer readable medium;
first programmatic instructions for creating the database instance, the database instance configured for providing a set of instance database objects, wherein the database instance is accessible by at least an instance user;
second programmatic instructions for creating at least one database tenant associated with the database instance, wherein the at least one database tenant includes a set of tenant database objects, wherein the at least one database tenant provides access to the database instance by the at least one tenant user, such that the at least one instance user and the at least one tenant user may independently access the database instance without affecting one another, wherein each of the at least one instance user and the at least one tenant user are configured with independent accessibility, wherein the at least one database tenant is addressable by a namespace of the form, DATABASE.TENANT.SCHEMA.TABLENAME,
wherein DATABASE identifies a database system instance, wherein TENANT identifies a database tenant, wherein SCHEMA identifies a table owner, and wherein TABLENAME identifies a table within the SCHEMA, wherein the namespace is configured to allow the database to store multiple production tables in the same database instance while keeping the multiple production tables having a same name completely independent from one another.

23. The computing device program product of claim 22 further comprising:
third programmatic instructions for generating an instance production table associated with the database instance for storing a portion of the set of instance database objects, the instance production table accessible by the instance user and the at least one tenant user, wherein at least some of the set of tenant database objects correspond with a portion of the set of instance database objects; and
fourth programmatic instructions for generating a tenant production table associated with the database instance for storing the set of tenant database objects, the tenant production table accessible by the at least one tenant user.

24. The computing device program product of claim 22 further comprising:
fifth programmatic instructions for receiving a query to the database;
sixth programmatic instructions for determining whether the query includes a first object corresponding with the set of tenant database objects;
if the first object corresponds with the set of tenant database objects, processing the first object from the tenant production table; else
seventh programmatic instructions for processing the first object from the instance production table.

25. The computing device program product of claim 22, wherein operations performed utilizing the at least one database tenant are configured for accessing the database instance without changing the database instance.

* * * * *